United States Patent [19]

Flecknoe-Brown

[11] Patent Number: 4,994,229
[45] Date of Patent: Feb. 19, 1991

[54] FORMING THERMOPLASTIC WEB MATERIALS

[75] Inventor: Anthony E. Flecknoe-Brown, Abbottsford, Australia

[73] Assignee: Hitek Limited, Victoria, Australia

[21] Appl. No.: 283,279

[22] PCT Filed: Mar. 17, 1988

[86] PCT No.: PCT/AU88/00072
§ 371 Date: Jan. 17, 1989
§ 102(e) Date: Jan. 17, 1989

[87] PCT Pub. No.: WO88/06965
PCT Pub. Date: Sep. 22, 1988

[30] Foreign Application Priority Data

Mar. 17, 1987 [AU] Australia .................. PI0888/87

[51] Int. Cl.⁵ .............................. B29C 51/42
[52] U.S. Cl. .................. 264/522; 264/210.5; 264/550; 425/325; 425/326.1; 425/384
[58] Field of Search ............... 264/550, 552, 551, 148, 264/151, 210.1, 210.2, 210.5, 280; 425/253, 296, 324.1, 325, 326.1, 384, 403.1

[56] References Cited

U.S. PATENT DOCUMENTS

| | | |
|---|---|---|
| 4,105,386 | 8/1978 | Thiel et al. .................. 425/217 |
| 4,150,930 | 4/1979 | Asano et al. |
| 4,235,579 | 11/1980 | Kurz et al. |
| 4,459,093 | 7/1984 | Asano .................. 425/145 |
| 4,722,820 | 2/1988 | Flecknoe-Brown .......... 425/325 |

FOREIGN PATENT DOCUMENTS

| | | |
|---|---|---|
| 0226748 | 10/1986 | European Pat. Off. |
| 2634976 | 2/1978 | Fed. Rep. of Germany |
| 57-96816 | 6/1982 | Japan |
| 2059328 | 4/1981 | United Kingdom |

Primary Examiner—Jill L. Heitbrink
Attorney, Agent, or Firm—Birch, Stewart, Kolasch & Birch

[57] ABSTRACT

A web of thermoplastic material extruded directly into a set of tempering rolls is cooled on its upper and lower surfaces while the interior of the web is kept molten. The partially cooled web is fed onto a converyor on which it is fed to a thermoformer. The web remains on the conveyor until its surface layer in contact with the conveyor is reheated to a thermoformable temperature below that at which the web will stick to the conveyor. Apparatus for feeding a web of thermoplastic material from an extrusion to a thermoformer includes tempering rolls and conveyor means which can be adjusted in their relative positions and to control the length of conveyor means contacted by the web.

16 Claims, 7 Drawing Sheets

FORMING THERMOPLASTIC WEB MATERIALS

BACKGROUND OF THE INVENTION

This invention relates to the general art of extruding thermoplastic material in a sheet form, then directly feeding and forming this hot plastic sheet material into hollow objects, such as food containers.

Such processes in general require a device for extruding the thermoplastic in sheet form, a set of temperature controlled tempering rolls to control the thickness of the sheet web and to reduce its overall temperature to the desired forming temperature, a device to transport the molten, often sagging web into a forming machine and a device to trim out the finished parts from the web, after these are formed and stabilized.

The range of materials which can be extruded in sheet form and used in the method of invention generally includes almost the whole known range of thermoplastics, and combinations thereof, either blended or simultaneously co-extruded in discrete layers by multiple extruders feeding into a single die.

In the application of this invention we are particularly, but not exclusively, interested in those materials which have melts which behave more as viscous fluids than as rubbery membranes. Typically, crystalline polyolefines such as High Density Polyethylene and Polypropylene have a sharply defined melting point and a melt rheology resembling a highly viscous fluid. Such materials sustain stress primarily by viscous resistance, and therefore sag or creep, when suspended as a sheet without full support. The cohesive elasticity which materials such as PVC and Polystyrene exhibit in their molten state, make them relatively easy to feed into thermoforming equipment and these have traditionally been the preferred materials for thermoforming.

Recently however, the advent of the high oxygen barrier polymers such as Ethylene Vinyl Alcohol (EVOH) Polyvinylidene Chloride (PVDC), has given rise to a new class of food packaging, wherein food is packed and sealed into a plastic package and sterilized in steam retorts, in much the same way as metal cans, at retorting temperatures up to 140° C. Polypropylene is one of the few readily available resins with the relatively high temperature resistance necessary to withstand steam serialization. It is often combined, usually by co-extrusion, with a layer of the aforementioned high barrier plastic, to produce the base material for high barrier plastic packaging.

Other forms of fabrication, such as injection molding, are not suited to economic production of multilayer hollow containers and the relatively mature art of thermoforming is therefore currently undergoing a developmental transformation aimed to achieving economic means of thermoforming retortable polypropylene-based high-barrier containers.

We have found that it is difficult to reheat and then thermoform pre-extruded polypropylene sheet. The melt sag which occurs immediately after the material passes through its crystalline melting point makes it very difficult to heat a suitably sized area of suspended sheet by known means, such as infrared radiation, and then to feed such a sheet of sagging molten material into a thermoforming machine of normal commercial size and output. Many of the current thermoforming process operators have found that they can often achieve reasonable results by forming polypropylene just below its crystalline melting point. This so-called solid phase forming usually leaves residual stress in the walls of a finished container and results in unsightly distortion when this stress is released during sterilization. A further problem of solid-phase forming is that the melting points of the commonly used EVOH and PVDC resins are higher than that of polypropylene, and a thin barrier layer of this material can be relatively easily damaged during forming at the solid-phase forming temperature of polypropylene.

Hence, we have developed a process and method by which polypropylene may be transported and formed in the so-called melt phase. Extruding the melt directly into a forming process overcomes many of the difficulties of reheating premade polypropylene sheet and lends further economies, such as a saving of energy which would otherwise be expended in reheating the premade sheet.

Two types of forming or "Thermoforming" machines can be used for such extrusion fed processes: Continuous and Intermittent Thermoformers. Continuous thermoformers, typically as described in Kurz, U.S. Pat. No. 4,235,579, operate with forming tools which move in approximate synchronization with continuously delivered molten sheet. In such machines, the problem of transporting the molten web is often solved by developing relatively constant tension in the web by running the moving forming tooling at a faster speed than the speed at which the molten web leaves the tempering rollers. Such a method is described in Flecknoe-Brown, U.S. patient application Ser. No. 762,069, herein incorporated by reference.

Intermittent thermoformers require feeding of the web in discrete lengths. When a direct extrusion feeding method is used to supply such machines, means must be provided to compensate for the lag caused between the continuous extrusion of the web and the intermittent feeding of discrete lengths of this continuously generated web, to the forming machines.

Thiel, U.S. Pat. No. 4,105,386 teaches the use of tempering rolls to form cooled supporting layers on an extruded web, and a movable compensating or "dancing" roller which is moved to accumulate the extra length of web between intermittent feeding.

There are a number of other thermoplastic materials which have fluid melts like the polyolefines. These include the polyalkylene terepthalates, polycarbonates and polyamides. These materials all have desirable properties for formed parts but are notoriously difficult, if not impossible, to feed into thermoformers without some means of supporting the soft, sagging, sheet of melt. In the past, attempts to use driven conveyor belts for supporting and transporting such materials for loading into a thermoformer have been frustrated by the natural tendency of these fluid melt materials to wet the belt material, and to remain adhered to it.

The use of a belt conveyor to support a molten plastic extrudate is not new in principle, being described in Loosen, European patent application Ser. No. 0,226,748 and in Asano, U.S. Pat. No. 4,459,093, which are herein incorporated by reference. This prior art does not address the problem of dealing with the belt adhesion of fluid melt materials.

Yet other methods disclosed in the prior art include the moving of the entire extruder towards and away from the forming station (Asano, U.S. 4,150,930) in combination with a synchronized extending carrier, comprising side chains and clamps which hold and support the sides of the molten sheet and convey it into the forming station. There is an obvious mechanical difficulty in moving the relatively massive extruder quickly enough to keep up with a thermoformer which may typically operate at 10 to 20 strokes per minute. There is also an evident further defect in that there is insufficient transverse support for sheet having a fluid melt, when suspended between longitudinal edge supporting clamps, only.

Finally, another approach is described in Keifer, Federal Republic of Germany Patent No. 2,634,976 wherein a catenary of molten web is supported between two driven rollers, initially held widely apart, then brought closer together to allow a festoon of material to develop between the two rollers, so taking up the excess length of material between feeds, whilst also ensuring that a zone of chilled material does not develop by constant contact between the downstream rollers and the molten sheet, held stationary between feeds. This approach again does not provide adequate support for a web of soft, fluid melt material, such as a molten polyolefine.

SUMMARY OF THE INVENTION

It is an object of our present invention, to provide an arrangement by which fluid melt materials delivered directly from an extruder, may be supported and transported in molten sheet form, into a forming machine of either continuous or intermittent means of operation.

It is a further object of our invention to provide an arrangement by which the aforesaid fluid melt sheet materials may be brought to their optimum forming temperature conditions prior to feeding into the forming station.

It is also an object of our invention to carry out such temperature conditioning, supporting and transportation of fluid melt webs so as to minimize or control any tension or stress exerted in the fluid melt, so that the parts formed from such melt are substantially uniform in thickness and consistent in properties, irrespective of the position or location each part occupied in any particular discrete length of web which was fed during forming.

It is a further object of our invention to provide a method by which the conditioning arrangement as well as the transportation arrangement may be adapted to temper and feed a wide variety of sheet melt materials and thicknesses and to enable the tempered sheet melt to be fed to either continuous or intermittent forming machines.

Accordingly one aspect of our invention provides a method of thermoforming hollow objects including: extruding a web of thermoplastic material directly into a set of temperature controlled tempering rolls, cooling upper and lower surface layers of the web by passage through said tempering rolls while maintaining the interior of the web in molten condition between said surface layers, feeding the partially cooled web onto a conveyor, and conveying the web to the entry of a thermoformer, characterized in that the web is allowed to remain on the conveyor until the surface layer of the web which is in contact with the conveyor has been reheated by the molten interior of the web to a thermoformable temperature below that at which the web will stick to the conveyor.

Another aspect of the invention provides apparatus for feeding thermoplastic sheet from an extruder to a thermoformer, including a set of temperature controlled tempering rolls to receive a web of molten thermoplastic material from the extruder, a conveyor to receive the tempered web from the tempering rolls and convey the web to the entry of the thermoformer, characterized in that the relative positions of the tempering rolls and the conveyor and the length of the conveyor contacted by the web are adjustable whereby the temperature of the web surface in contact with the conveyor can be controlled so that it enters the thermoformer at a thermoformable temperature below that at which the web will stick to the conveyor.

BRIEF DESCRIPTION OF THE DRAWINGS

We now briefly describe the invention with particular reference to the drawings.

DETAILED DESCRIPTION OF PREFERRED EMBODIMENTS

The invention is now described in more detail, with particular reference to the drawings.

Figure 1:
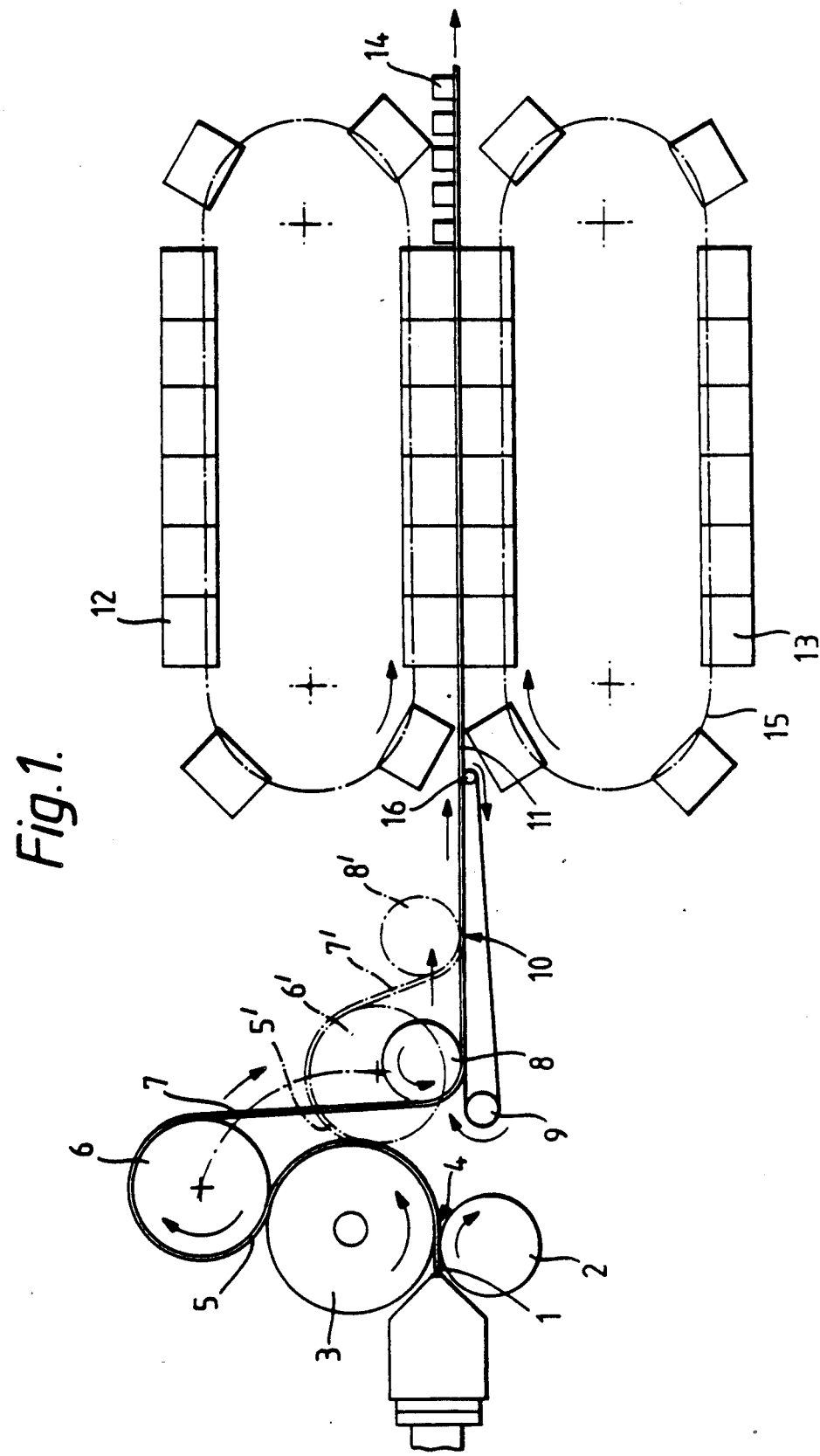
FIG. 1 shows one embodiment of our invention as applied to a continuous thermoformer.

In FIG. 1, our invention is applied to a continuous thermoformer wherein a fluid melt sheet 1, issued form an extrusion die, passes between two tempering rollers 2 and 3 which nip the sheet at position 4, controlling its thickness. The material is then maintained in contact with tempering roller 3, by an adjustable tempering roller 6, which can be moved to a number of positions such as 6', according to the type and thickness of material being processed and the processing conditions.

The material sheet 7, now with its underside skin frozen into a solid state, is led onto a moving conveyor belt 10 via an optional turning roll 8, also shown in an alternative position 8'. The conveyor belt 10 is driven by a temperature controlled roll 9 which serves to control the temperature of the aforesaid belt.

The sheet of substantially fluid melt then leaves the conveyor at position 11 before its lower skin has remelted due to the flow of residual heat from within the sheet melt. This avoid adhesion to the belt 10.

The material then enters a continuous forming machine, one embodiment of which is a machine 15, comprising opposed pairs of moving male moulds 13, and female moulds 12, which then mould the melt sheet into the finished parts 14.

In FIG. 1, a sheet of web 1 of fluid melt is continuously extruded from a die, directly into the gap, 4, between the constantly rotating rolls 2 and 3. The thickness of the fluid melt, whilst primarily dependent on the gap set between the lips of the extrusion die, is also dependent on the surface speed of rotation of the rolls 2 and 3 in relation to the linear speed at which the melt is being extruded, as well as the gap 4 between them. It is generally preferable to set the speed of the rolls, so that the gap 4 is slightly overfilled with melt. This ensures that a constant web thickness issues from the roll gap 4, irrespective of minor surges in the rate of material delivery from the extruder.

At a given sheet thickness and extrusion rate there is thus usually one optimal speed at which the rolls should be run. Any attempt to control the temperature of the web must therefore be done either by varying the roll temperature, or by varying the length of contact of the web with the rolls. It has been found that variation of roll temperature alone, cannot give a sufficient degree of control of web temperature, especially for thicker webs. The control requirements for a web which is to be fed at a Certain temperature to a downstream forming process are much more critical than normally encountered in extruding melt into a roll-stack for making sheet. Accordingly, we have incorporated an adjustable roll 6, which can be lifted or pivoted in relation to roll 3, so controlling the angle of wrap around both rolls 3 and 6.

The main purpose of roll 3 is to assist in reducing the average temperature of the sheet down to its best thermoforming temperature. Contact of the web with roll 3 first, ensures that there is sufficient time to allow the residual heat within the web to reheat back to the top surface and to soften any material which may have been frozen there.

It is important to note that crystalline polymers like polypropylene, do not form a crystalline solid immediately on cooling, nor do they immediately lose all of their crystallinity when heated over their crystalline melting point. It is thus not strictly accurate to talk of freezing to solid and remelting back to liquid but rather it is to be understood that the process of our invention cools the lower skin of the web to a temperature where it is too stiff or viscous to wet the conveyor belt material and thus adhere to it.

Controlling the angle of wrap together with the temperature of the rolls 3 and 6 also gives a further and unexpected benefit in that it is then possible to control temperature profile within the thickness of the web of plastic material. Plastic materials have a thermal conductivity typically approximately 800 times less than that of metals. The core temperature of a plastic sheet contacting a roller is therefore substantially higher than the skin temperature, and we have found that it takes many seconds in the case of sheets of over 3 mm in thickness, for heat flow from the centre to the outside of the sheet to equalize the temperature difference, once roll contact ceases.

Thus roll 6 is used to chill and freeze the underside of the web, by substantially reducing the surface temperature, whilst reducing the average temperature within the web to a much lesser extent. The web, as a whole, thus remains in a formable condition.

The web then passes from the roll 6, via an optional driven web-directing or turning roll 8 onto a driven conveyor belt 10. The surface speed of roll 8 is normally synchronized to roll 6, as is the belt speed of the conveyor. Some stretching can be imparted to the web, by running rolls 6 and 8 progressively faster than roll 3.

We have found it is possible to prevent the hot web from adhering to the belt if the length of contact of the sheet with the belt is limited to a time less than the time taken for enough heat to flow from the hot molten inside of the web to the cooler, more solid, underside surface of the web, to reheat this underside surface sufficiently for it to become fluid enough to wet and stick to the belt material. The average temperature of the conveyor belt material 10 can be regulated by means of a temperature controlled roll 9, to further slow down or speed up the rate at which the underside skin reheats.

We have also found it desirable that reheating of the cooler underside skin should substantially occur before the material enters the forming station, for uniform, stress-free formings to result.

The material of construction of the conveyor belt is not narrowly critical. Polytetrafluoroethylene-coated woven fiberglass and polyurethane elastomer-coated cloth have both been successfully used as belt materials.

It is preferred that the flexible conveyor belt be constructed from a relatively thin material, preferably less than 0.5 mm in thickness, so that the thermal storage capacity of the belt is not high.

The belt material may take the form of a continuous sheet, a series of tapes, an open weave sheet or a sheet incorporating perforations. It is preferred however that the belt contact the hot web uniformly so as to maintain a uniform temperature in the web.

In this embodiment, a continuous thermoformer 15 has opposed, moving sets of female molds 12 and male molds 13, which clamp together onto the hot web some distance after the web leaves the exit end of the conveyor at roller 16.

It is preferable to locate the female mold 12 on the upper circuit of the forming machine 15 so that any marking on the sheet from the conveyor belt contact which persists through the forming operation, faces into the inside of the container, which is usually hidden by the contents.

The linear speed of the opposed mold sets is set in synchronous relationship to the conveyor belt speed, and is usually slightly faster than the belt speed.

The weight of the final parts 14 produced in the former can be finetuned by making minor adjustments to the former speed, in relation to the rest of the line.

Figure 5:
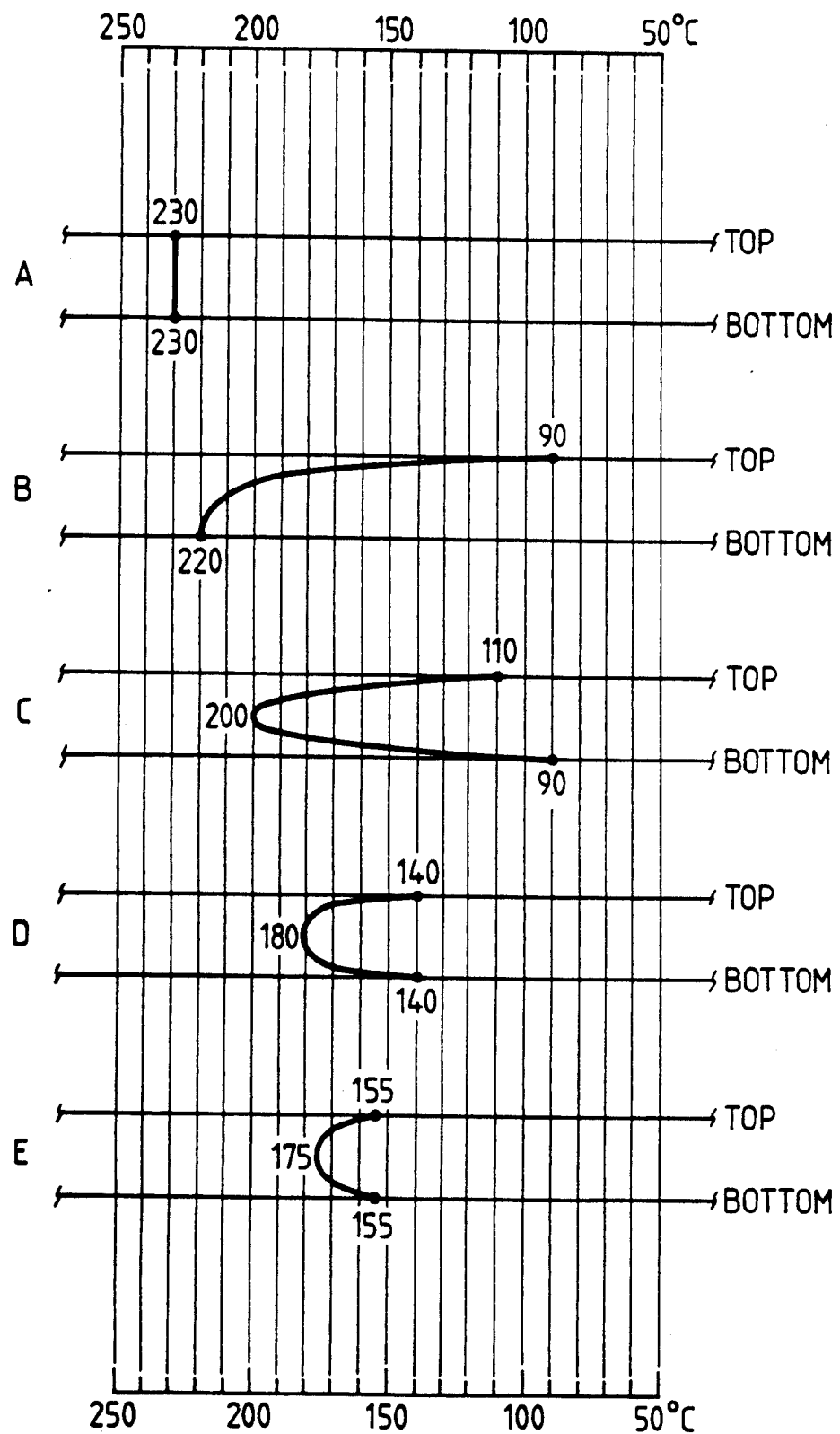
FIG. 5 shows typical temperature distributions within the sheet melt as it passes through various stages in the conditioning and feeding process of our invention.

In order to better explain the way in which the method of our invention can be used for a wide variety of different types and thickness, reference is made to FIG. 5 which is an approximate representation of the internal temperature profile of a polypropylene web of 5 mm thickness, as it is processed from the die to the forming machine.

FIG. 5A illustrates the temperature distribution through the thickness of the web from the top surface to the bottom surface as it just leaves the extrusion die. In FIG. 1 this is the location labelled 1. As can be seen from FIG. 5A the temperature is represented as uniform through the web, at 230° C., which is the extrusion temperature in this case.

The web condition shown in FIG. 5B represents that at point 5 in FIG. 1. Here we see that the top surface of the web has been cooled down to the roll 3 surface temperature of 90° C. whilst the underside of the web is represented as having cooled to 220° C.

FIG. 5C represents the web condition at location 7, FIG. 1. Here the top face of the web has been reheated by heat flow from the centre of the web, which is now at a lower temperature, 200° C., than the extrusion temperature 230° C. In this case, the bottom face of the sheet is now at the roll 6 surface temperature of 90° C.

FIG. 5D represents the approximate web condition at FIG. 1, point 10. Here, both surface temperatures have increased due to heat flow from the centre of the web. The top surface temperature is kept under the crystalline melting point of around 155° C. due to the cooling effect of roll 8 and rises from about 110° C. to about 140° C. The bottom surface temperature (20° C. lower than the top surface temperature at location 7, FIG. 1) has also increased to about 140° C. due to heat flow from the centre of the web without any substantial countervailing cooling effect.

Allowing the web surface material to reheat itself while supported on the belt, brings the web material back to the correct average temperature for forming, but the web is still formed with a temperature profile similar to that of FIG. 5E. At approximately these surface temperatures the material is again fluid enough to actually wet the belt and adhere to it, hence it is important to adjust the distance (and therefore the time, at a constant belt speed) over which the belt is in contact with the web. This adjustment is shown in FIG. 1 by the second position of the optional turning roll 8', shown in broken outline. If a turning roll is not used, it would be sufficient to adjust the position of roll 6' in relation to the conveyor roll 9 so that the web hangs down from roll 6' and contacts the belt at the same distance from roll 16 at the exit end of the conveyor.

In general, the roll diameters used can be widely varied, but depend on the linear velocity of the webs to be processed. This, in turn depends on the web width and thickness to be processed, along with the extrusion output and the size and cooling capability of the forming machine.

It is a further important feature of the method of our invention, that convenient adjustment of the process can be made to accommodate a wide range of web thicknesses at a given processing rate, typically from 1 mm in thickness to 8 mm in thickness.

Referring again to FIG. 1, the roll 6, shown in a position suitable for 5 mm web thickness, can be moved to position 6' for a sheet of 2.5 mm thickness. The contact length of the web with the rolls 3 and 6' is now slightly less than halved. Furthermore, 2.5 mm sheet will generally be extruded at twice the linear speed of 5 mm sheet, as the extrusion process delivers material at an approximately constant mass flow rate. Hence the increased speed at which the melt issues from the die, in combination with the reduced contact length, causes the roll contact time of this 2.5 mm sheet to be about 4 times less than for 5 mm sheet. This reduction in roll contact time will again lead to similar temperature profiles in the sheet at location 5' FIG. 1 as shown in FIG. 5B and at location 7' FIG. 1 as shown in FIG. 5C.

It is also important to then reduce the contact length of 2.5 mm thick web with the conveyor so as to effect a similar proportionate reduction in belt contact time, as was done with roll contact time. The roll 8 is thus moved to a new position 8'. For material thinner than 2.5 mm the adjustable roller 6' is merely moved further downward, around roll 3 towards roll 2. In this case, the conveyor roller 9 must also be lowered to accommodate the lower position of roller 6. By such adjustment means, it is thus possible to optionally temper and feed a wide range of material types and thicknesses.

J. P. Holman in "Heat Transfer" 6th Edition, McGraw-Hill Book Company, Section 4.3 derives the unsteady state heat conduction equation for a semi-infinite solid (i.e. neglecting heat loss to atmosphere), as $$T(t) = (T_E - T_R) \cdot erf\left[\frac{(S_T)}{4\sqrt{\alpha t}}\right] + T_R$$

where
  $T(t)$ = temperature at the midpoint of the sheet at time $t$ (° C.)
  $T_E$ = temperature of the extruded sheet (° C.)
  $T_R$ = temperature of the roll stack
  $S_T$ = web thickness (m)
  $\alpha = k/\rho c$
where
  $k$ = thermal conductivity (w/M. ° C.)
  $\rho$ = density (kg/m$^3$)
  $c$ = specific heat (kJ/kg. ° C.)
  $1 \times 10^{-7}$m$^2$ sec for polypropylene but depends on temperature
  erf = the Gauss error function From this equation, it is possible to determine the approximate roll-contact residence times and conveyor lengths needed for a wide variety of raw materials. In general, the properties of density, thermal conductivity and specific heat vary with temperature for most plastics.

To further illustrate the two cases for FIG. 1 above, the following two examples evaluate the relative roll contact time required on Roll 3, for a polypropylene web of 5 mm thickness, and 2.5 mm thickness, respectively.

EXAMPLE 1

For 5 mm web around a 500 mm diam. roll wrap angle 180°, at 5 m/mm web speed.
  $T(t)$ = Temp of mid-point of extruded sheet. (Expected value after Roll 3 contact is about 200° C.)
  $T(E)$ = Temp of extruded sheet = 230° C.
  $T(R)$ = Surface temp of roll = 90 C. = temp of surface of web material in contact with this roll.

$S_T$ = Web thickness = 5 mm = .005 m $\alpha = 1 \times 10^{-7}$ $t$ = roll contact time = 9.5 secs
  (500 mm roll @ 5 m/min over 180° wrap angle)

$$\frac{S_T}{4\sqrt{\alpha t}} = \frac{0.005}{4\sqrt{9.5 \times 10^{-7}}}$$

$$erf\left[\frac{S_T}{4\sqrt{\alpha \cdot t}}\right] = 0.93$$

$T(t) = (230 - 90) \cdot .93 + 90$
      = 220.2° C.

EXAMPLE 2

For 2.5 mm web, around a 500 mm diam. roll, wrap angle 100° at 10 m/min web speed.

$T(t)$ = Temp of mid-point of extruded sheet (expected value after roll 3 contact is about 220° C.)
$T_E$ = Temp of extruded sheet = 230° C.
$T_R$ = Roll surface temp. = 90° C.

$S_T$ = web thickness = 2.5 mm = .0025 m
   = 1 × 10$^{-7}$ $t$ = roll contact time (sec) = $\frac{.5 \times \pi \times 60}{10 \times 3.6}$
   = 2.62 secs $\frac{S_T}{4\sqrt{at}} = \frac{.0025}{4\sqrt{2.62 \times 10^{-7}}}$
   = 1.22

$erf\left[\frac{(S_T)}{4\sqrt{at}}\right] = .916$ $T(t)$ = (230 − 90) .916 × 90
    = 218.2° C.

This confirms the example used in FIG. 1 i.e. for a halving of sheet thickness, the roll residence time has been reduced by a factor between 3 and 4, to achieve an internal web temperature profile near to that shown in FIG. 5B.

Figure 2:
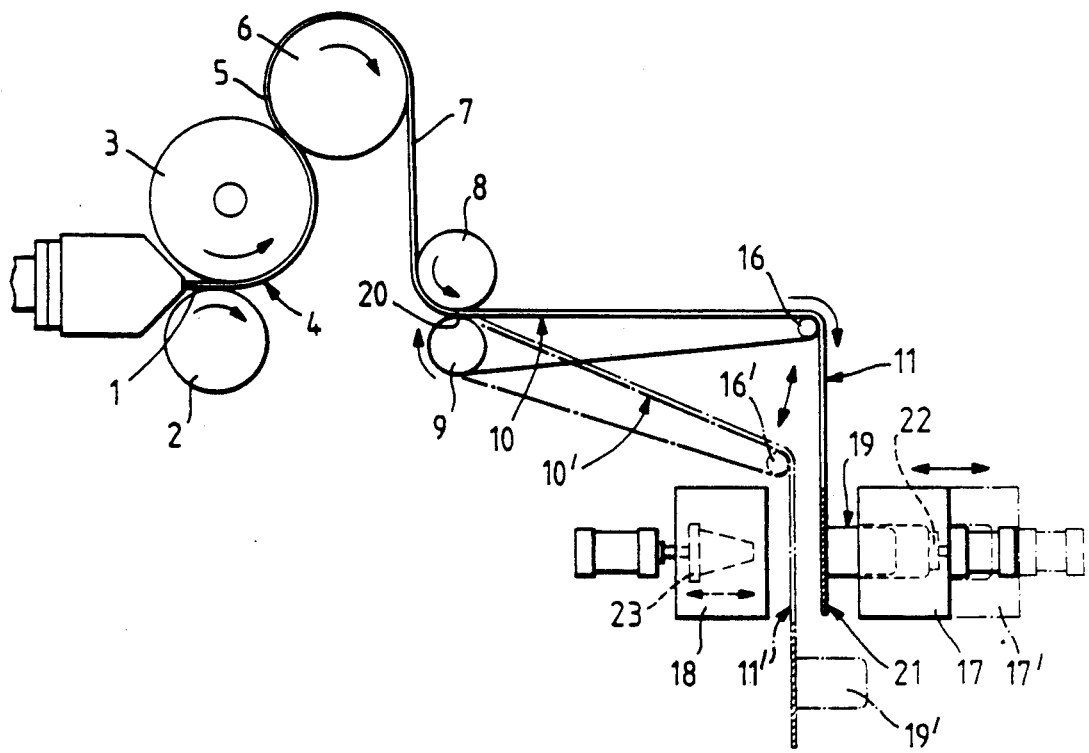
FIG. 2 shows another embodiment of our invention wherein the web supporting conveyor is arranged to pivot about a movable pivot point which lies in the plane of the sheet web.

A second embodiment of our invention is shown in FIG. 2. In this embodiment the web 11 continuously leaves the conveyor and feeds vertically between a set of fixed opposed molds 17 and 18 which do not move in the direction of web feed. The mold 17 is shown as it is opening with a formed product 19 in a partially extracted position. The hatched section of sheet 21 represents sheet frozen by its previous contact with the molds.

After a short period of time elapses, the mold moves to its fully open position 17' and the end of the conveyor 16 moves to its lower position 16'. The point 11 on the sheet is now positioned at 11' and the mold 17 begins its closing and clamping movement to clamp the molten web and to form the next part.

The adjustable tempering action of the rolls and the supporting action of the belt has not changed from that of FIG. 1, but the belt has been arranged to pivot about the pivot point 20, which lies in the plane of the sheet approximately where it first contacts the surface of the belt after leaving the turning roll, 8. In this way, the pivoting action of the conveyor does not greatly disturb the web, other than flexing it through the same angle as the conveyor is rotated.

As the belt is moving continuously with the web it supports, this flexing action does not take place in a single localized band of web, and has been found not to significantly change the path length of the web or to distort the web in any way which affects its thickness, temperature profile, delivery rate or formability.

The moving conveyor can be timed to load new material between intermittently operating thermoforming molds 17 and 18, which in this embodiment are not moved in the direction of web travel.

The continuous feed of the web is thus accumulated between forming tool cycles by lifting the end of the conveyor 16' to position 16, at the same rate as the web is delivered onto the conveyor belt.

Figure 3:
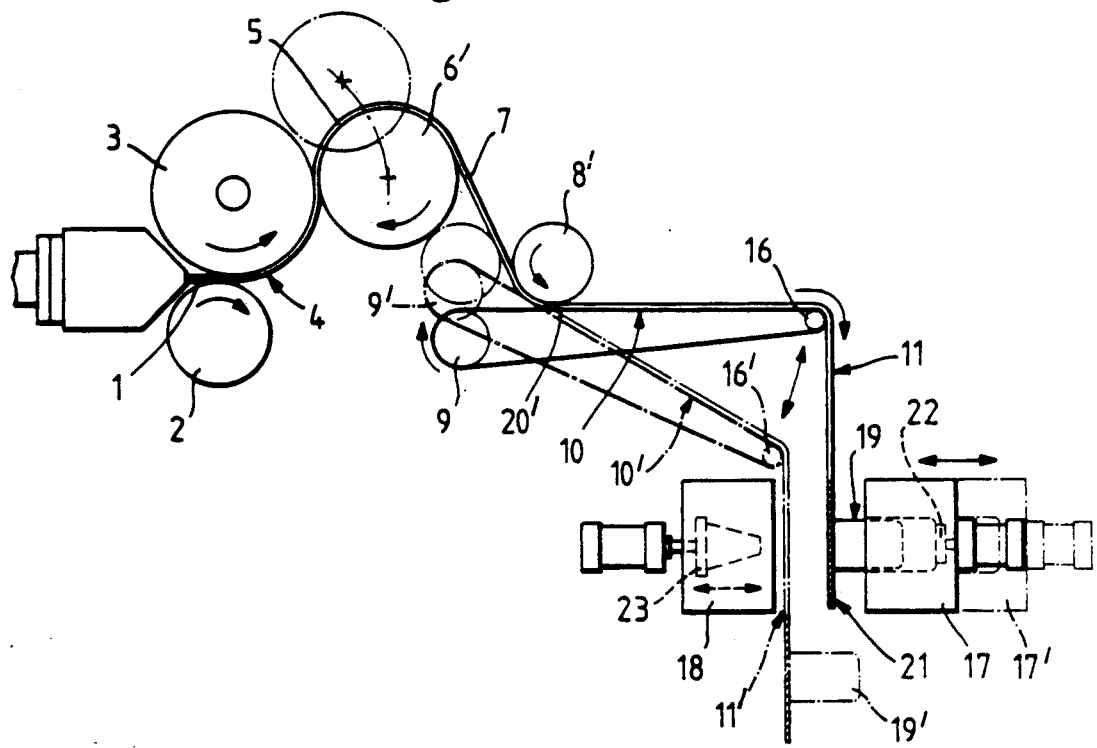
FIG. 3 shows an alternative location of the rolls in FIG. 1.

FIG. 3 is similar to FIG. 2 but shows an alternative location of the rolls, 6' and 8', which are arranged to give less contact time and therefore less cooling time to the hot sheet. The pivot point 20 has also been moved further along the conveyor whilst remaining in the plane of the sheet to a point 20'. Thus the supported length of the molten sheet on the moving conveyor is lessened, but the pivoting action of the conveyor required to feed the sheet at location 11 into the location 11' has been maintained.

In order to better understand how the method of our invention may be accommodated to this Intermittent thermoforming process, we refer now to FIG. 4.

Figure 4A:
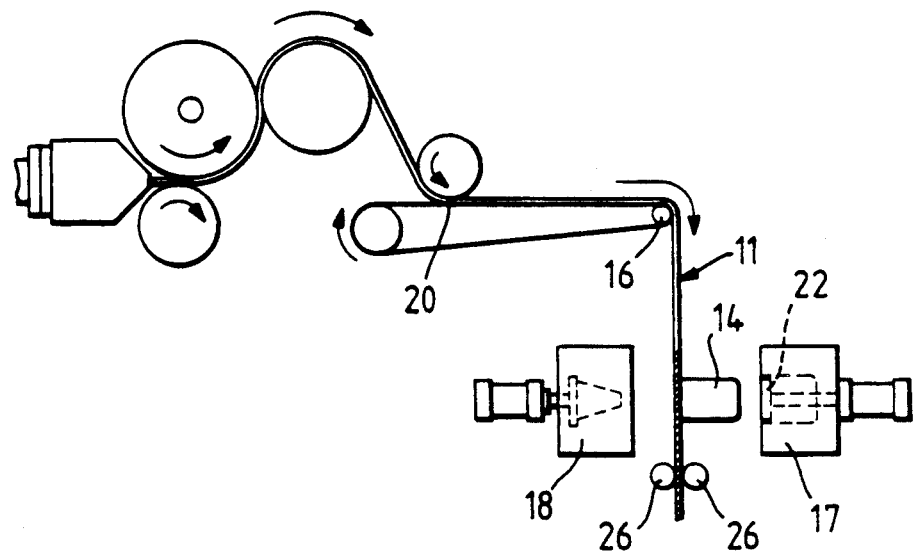
FIG. 4 shows further details of our invention, by which continuously delivered fluid melt sheet from an extruder is temperature conditioned, supported and conveyed into an intermittently operating forming machine.

In FIG. 4A, the female mold 17 is in its fully retracted position and an ejector 22 is in its extended position at the open mouth of the female mold, to ensure that the formed container 14 has been pushed completely clear of the mold opening. The sheet is also in a solid condition to the top of the mold 17. The cold sheet fed from the previous forming cycle, which protrudes below the bottom of mold 17, is passed between two sets of opposed pairs of driven pinch rollers 26, or other traction means, so disposed as to grip the outside edges of the sheet but to remain clear of any path of subsequent movement of the formed product 14.

The rollers 26 are held immobile at that moment in the cycle represented in FIG. 4A and thus they support, from under the mold 17, the full weight of the frozen sheet extruding to the top of the mold 17. At that same moment, the conveyor is pivoting around a pivot point 20, so that the conveyor roller 16. travels upwardly at the same velocity to that with which the web 11. is discharging from the end of the conveyor. Hence, that section of hot hormable sheet suspended vertically between the frozen section of sheet and the conveyor roll 16, is neither being substantially stretched nor compressed.

Furthermore, it is important to understand that the disposition of the cooling rolls and the conveyor is so arranged that the condition of the sheet leaving the conveyor is such that the cooler, relatively stiffer underside layer on the conveyor has not been allowed to reheat to the same extent as that illustrated in FIG. 1 and in the description related thereto, so that this stiffer layer will be still reheating in the vertically suspended section of hot sheet situated between the roller 16 and the solid sheet which commences at the point of horizontal alignment with the top of the mold 17.

In fact, this stiffer layer will be reheated proportionately more after it leaves the conveyor exit point at roller 16, until it reaches the junction with the cold sheet. We have found an unexpected benefit in that the gradation so produced in the stiffness of this aforesaid stiffer layer, acts to reduce the natural tendency of the web to sag vertically to a greater degree in that region of the web which is closest to the exit point of the conveyor roller. This tendency, due to the weight of the web hanging below this region, is now substantially balanced by progressive reduction in skin thickness, so that the hanging web is found to remain of relatively uniform thickness. Any accumulated total sag can then be accommodated by slightly increasing the vertical speed of lifting of the roller 16. over the speed with which the web leaves the end of the conveyor.

Figure 4B:
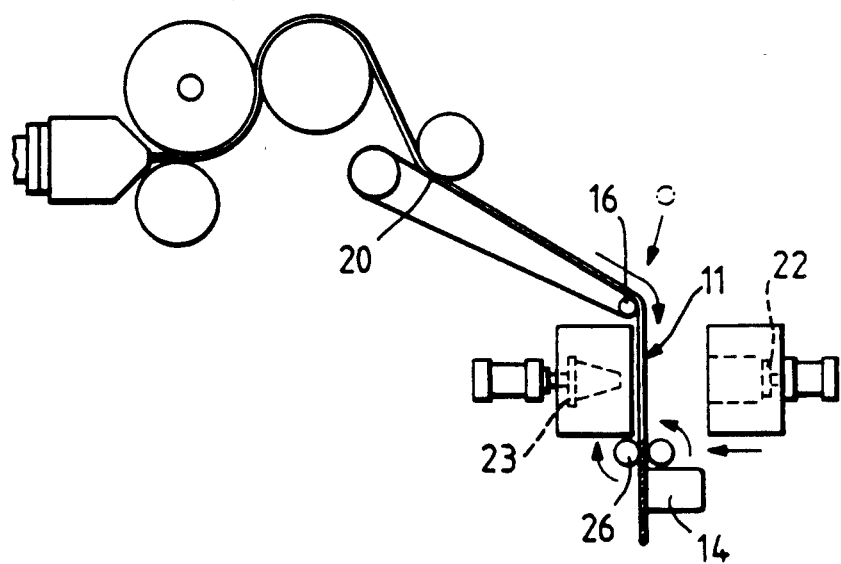

In FIG. 4B the conveyor is then pivoted downward about pivot point 20 at a relatively faster rate than the web delivery rate. The rate at which conveyor roller 16 is lowered by this pivoting action is matched by the surface speed of the now rotating pinch rollers 26, so that the section of web now being lowered between the molds 17 and 18 is neither substantially extended nor compressed. The pair of pinch rolls 26 may also be moved sidewise, as shown, to match any sidewise component of motion of the conveyor roller 16, as the conveyor is pivoted.

The finished product 14 has thus also been moved down, as has the solid section of web surrounding but not necessarily attached to it.

It is also to be noted that the rotational speed of roller 16 is maintained constant during this and subsequent operation.

Figure 4C:
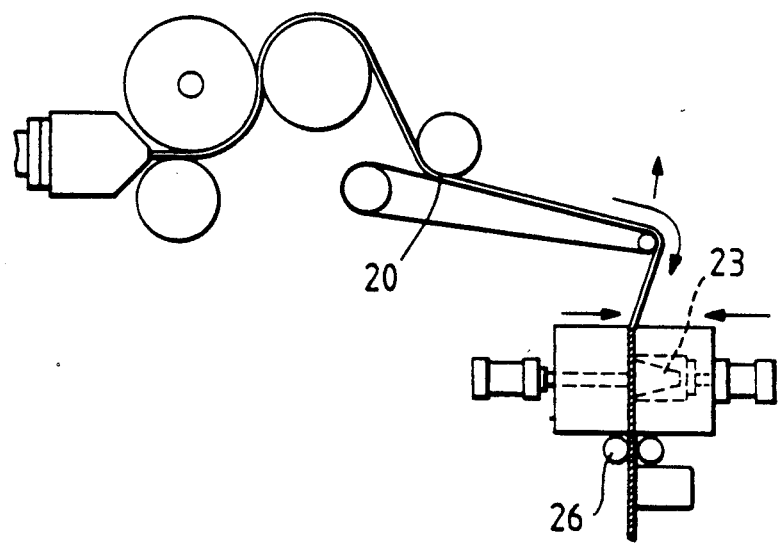

In FIG. 4C, the conveyor is shown again pivoting upwardly at a rate similar to the rate at which the web is leaving the conveyor roller 16. The molds are in the closed and clamped position, and the male stretching tool 23, has been inserted into the hot web to assist in forming a new product.

In typical thermoforming, the molds occupy this clamped position for most of the overall cycle time, usually for more than 70 percent of the cycle time.

Figure 4D:
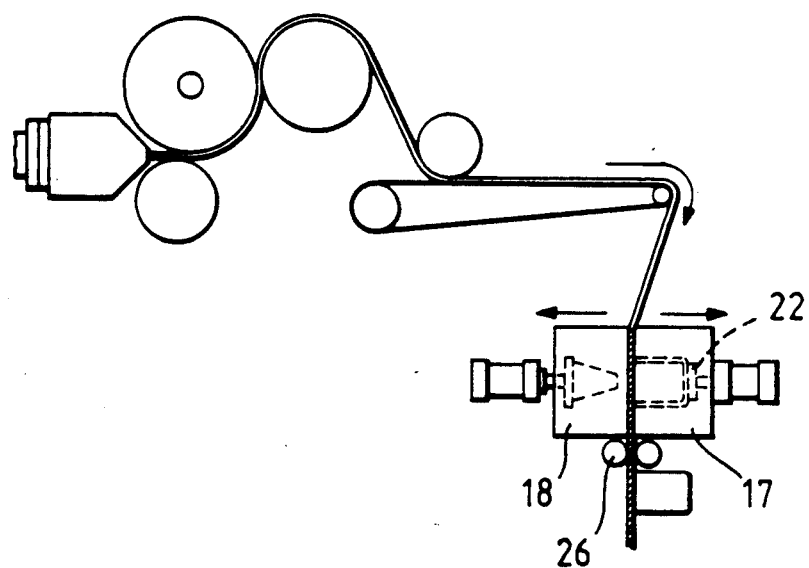

In FIG. 4D the conveyor is shown still pivoting upwardly to its topmost position, and the molds are about to open. After the molds are open, the cycle will be complete and the cycle will begin again, as in FIG. 4A.

In order to further understand the way in which the method of our invention may be simply adjusted to accommodate webs of varying temperature, material, thickness and running speed for feeding web to an intermittent thermoformer, FIG. 3 shows the adjustable roll 6 in a new position 6', and the turning roll 8 in a new position 8'. The pivot point 20 is also now moved to a new position 20', and remains located in the plane of the sheet where the sheet leaves the turning roll 8' and first contacts the conveyor belt 10.

This configuration is typically used for processing polypropylene web of 2 to 3 mm, whereas the roll 6 position in FIG. 2 is typically used for a thicker polypropylene web of 4 to 5 mm.

It is preferable that the angular position of roll 6 be adjustable to any position from vertical alignment with roll 3, in its topmost position, through about 135° down to where the surface of roll 6 is close to contacting the surface of roll 2.

Similarly, the point at which the sheet leaves roll 6 and feeds onto the conveyor belt which also establishes the location of the pivot point 20, should preferably be adjustable over a distance of about ⅔ of the length of the conveyor, as represented by the centre distance between conveyor roll 9 and conveyor roll 16. It is further preferable but not necessary that all of these adjustable positions of the rollers 6 and 8 and the conveyor pivot point 20 be linked by a mechanism which maintains a predesired geometric relationship between them. Many suitable mechanisms and apparatus for achieving this will be obvious to those skilled in the art and it is not intended to limit this invention by constraining it to any one form of such mechanism.

It is clear from FIG. 3 that it is to be possible to adjust the position of the pivot point 20 without limiting the degree of rotation of the conveyor to an extent that the vertical distance moved by the exit end of the conveyor 16 is adversely reduced.

The scope of this invention is not to be limited by the means described in FIGS. 2 and 3 for varying the pivot point 20 to 20' to accommodate thinner web. It is also possible, for example, to achieve the same result by keeping the conveyor roll 9 together with the turning roll 8', but to shorten the contact distance of the web on the conveyor, by moving conveyor roll 16 closer to conveyor roll 9.

Figure 6A:
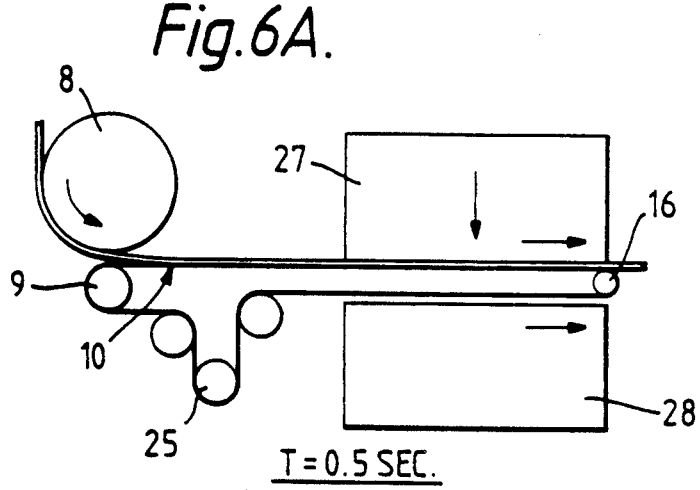
FIG. 6 shows another embodiment of our invention, with the conveyor adapted for feeding to a forming machine which has horizontally moving forming tooling.

A further variation of the method of our invention is shown in FIG. 6, wherein the length of the conveyor is extendable to support the web into the gap between two movable opposed pairs of molds 17 and 18. In FIG. 6 the web is tempered by adjustable rolls (not shown) using the same method as described for FIGS. 1 to 4 above, and is fed onto a moving conveyor belt 10 via an optional turning roll 8. In this example, a web of thickness 1.5 mm is shown feeding onto the conveyor at a constant rate of 6 m/min. The belt conveyor has a temperature controlled, constant speed drive roll 9, horizontally movable roll 16 and a vertically movable takeup roll 25. FIG. 6A shows the lower tooling 28 in its fully open, lowest position whereas the top tooling 27 has been lowered onto the hot web to engage with it. It is intended then to hold the web to the face of the upper tool 27 by means of applied vacuum. During the action of lowering the top tooling onto the web and applying vacuum, the top tool and the conveyor roll 16 are both to be moving in the material flow direction at 6 m/min, and are to be aligned together.

Figure 6B:
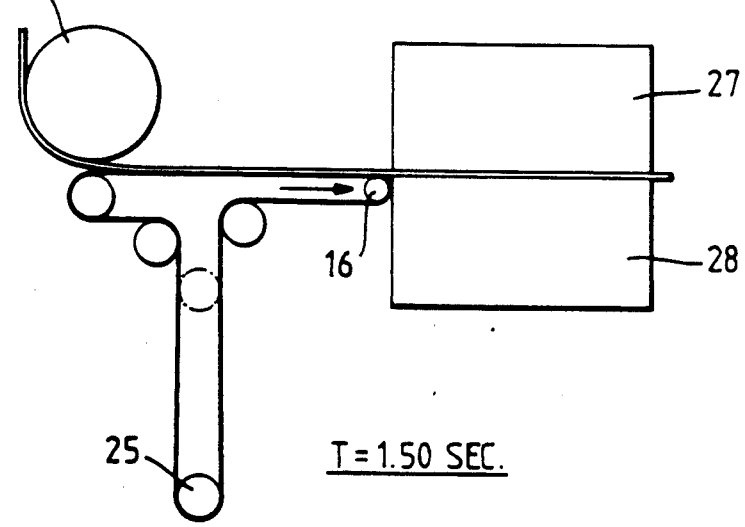

In FIG. 6B the top and bottom tools are now shown clamped together, moving in alignment at 6 m/min in the material flow direction. The conveyor roller 16 was withdrawn from between the molds, before closure, leaving the vacuum clamped section of web behind, attached to the top mold. In order to withdraw the conveyor belt without damage to the web, it is important that adhesion between the belt and the web be avoided by the method of web conditioning of our invention.

To accommodate the now shortened distance between rolls 9 and 16, and to maintain tension in the conveyor belt 10, the movable roller 25 was lowered simultaneously with the backwards movement of roller 16. After its relatively rapid backwards movement, roller 16 then immediately begins its forward movement at a velocity of 6 m./min, in order to maintain the relative belt velocity at zero, immediately above itself. The roller 16 then moves forward immediately behind the clamped molds, supporting substantially all of the hot web except that already clamped between the molds, whilst the product forming and cooling takes place.

Figure 6C:
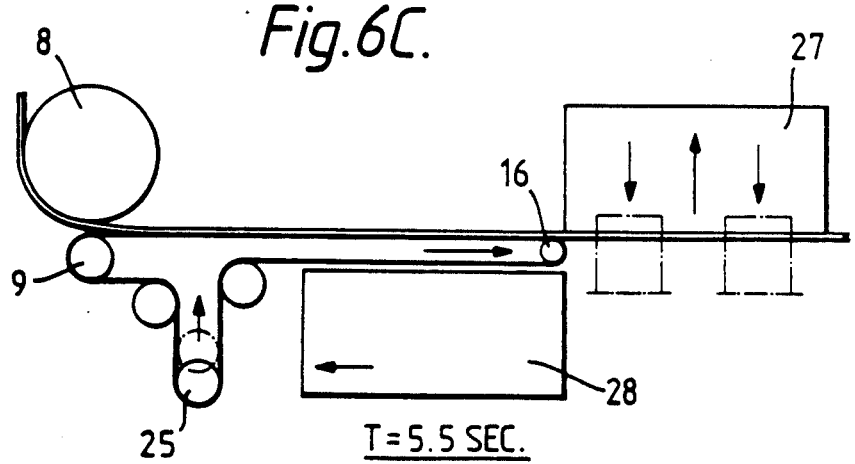

In FIG. 6C we see one means by which the tooling can be separated, and the formed parts ejected. The lower tool 28 was lowered down from its clamped position and has been indexed or moved backward to a point behind the starting position it occupied in FIG. 6A. The finished parts are then pushed out of the top mold by ejectors, prior to the return of the top mold to its starting position, as shown in FIG. 6A.

Another variation of the method of our invention is shown in FIG. 7, where the web is again first conditioned about a set of adjustable tempering rollers according the method hereinabove described and again fed at constant rate, onto a moving conveyor belt by means of the turning roll 8. The temperature controlled driver roll 9 is driven at the same surface speed as roll 8, but roll 16 is driven at a variable speed, in order to hold the material stationary while the molds 17 and 18 are clamped together (not shown) during the forming of the product 19. Molds 17 and 18 have no movement in the direction of material feed. When the forming cycle is complete, and the molds 17 and 18 have been retracted to their fully open position, roll 16 is then driven at a relatively faster surface speed than that of roll 9, to feed new hot material, 11, between the molds for the next forming cycle. The constantly fed material is accommodated during the forming cycle whilst the roll 16 is stationary, by lengthening the top of the belt by means of a lifting roll 24, which is lifted upwardly at a varying speed which maintains the top surface of the belt under tension, so that the top surface of the constantly moving belt is lengthened at the same rate that the material is delivered onto it.

Optional, driven pinch rolls 26 are provided in order to support the weight of the frozen material and finished product, as described in more detail for the method described with reference to FIG. 4.

The cyclic lengthening and shortening of the belt on the top surface is then accommodated by means of the movable roller 25.

Figure 8:
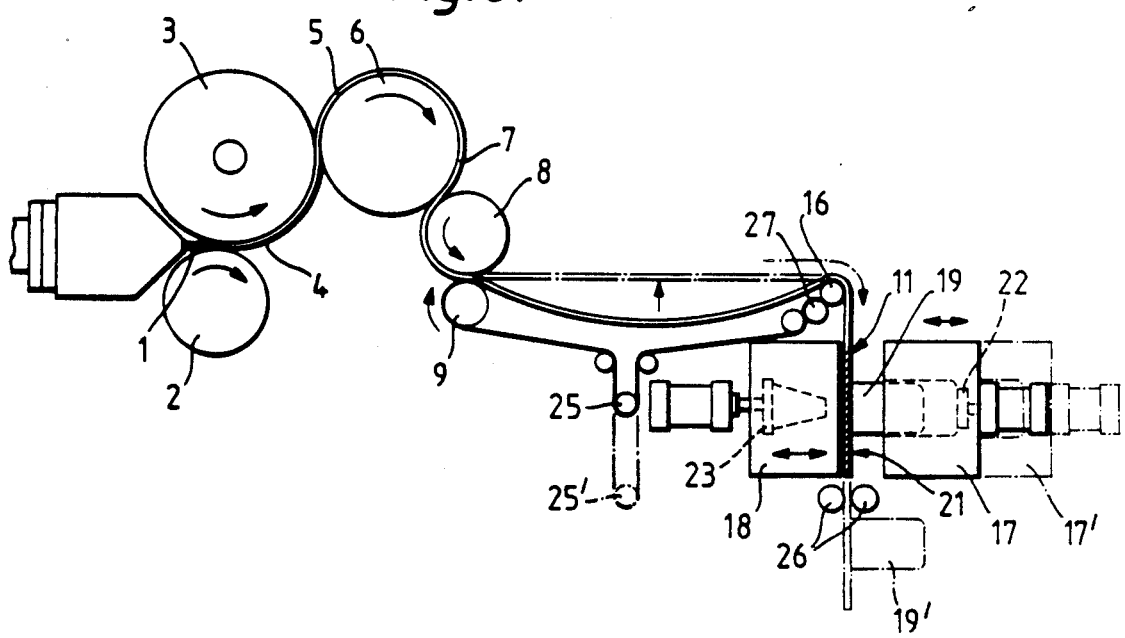
FIG. 8 shows a further embodiment of our invention, with storage of the material in a hanging loop in the belt.

FIG. 8 shows yet another variation wherein the material is stored in a hanging loop in the belt, which is generated by stopping the pull-off roll 27, and allowing the "dancing" storage roll 25 to give the excess belt length to the top of the conveyor via the driven roll 9. The length of the belt on the top surface is increased to accommodate the constantly fed material between the cyclic operation of the molds 17 and 18. In this case, roller 27 is driven at a varying speed, in order to drive the belt and the web material supported by it over roller 16, when the molds 17 and 18 are in the fully open position. The required entire length of the top surface of the belt is, in this case, accommodated by allowing the belt to sag downwards together with the weight of the web material, during that period of time when the driven roller 27 is held stationary.

Figure 7:
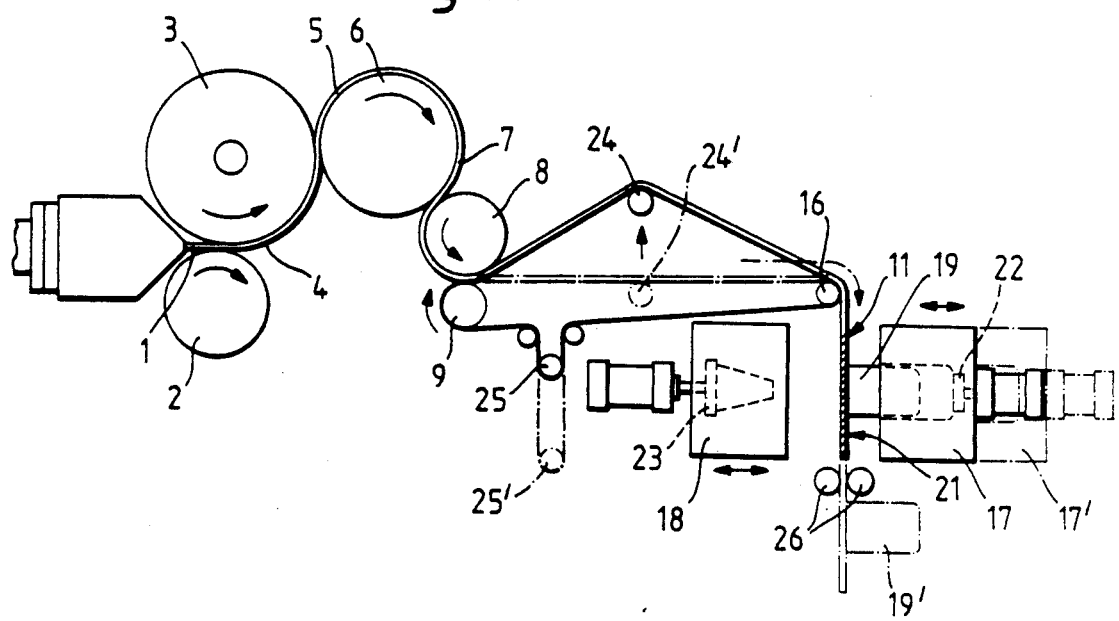
FIG. 7 shows another embodiment of our invention, with the conveyor adapted to store the material on the belt until the forming tooling is open and ready for the next feed.

In all other respects, the methods shown in FIGS. 7 and 8 operate identically.

It will be evident to those skilled in the art that there are certain advantages and disadvantages of the methods described in FIGS. 7 and 8 over that described in FIG. 4. One advantage is that the web is fully supported, except during the relatively short duration of feed of the next section of melt between the open molds, which may reduce the tendency of the vertically hanging unsupported web of the method of FIG. 4, to undergo extension by vertical sag. A disadvantage is that the methods of FIGS. 7 and 8 (as well as the method of FIG. 6) require prolonged contact of the material with the belt, and more chilling of the underside skin of the web will be required if adhesion of the web to the belt is to be avoided. It is also evident that the section of the web material which is held stationary over the conveyor end roller 16 in the methods of FIGS. 7 and 8, will experience a different thermal environment due to the presence of roller 16. This may lead to narrow bands in the web, which have different formability than the rest of the web. These bands may not be usable as part of any finished product, but can be merely clamped in the molds outside the finished product area. This may lead to a decrease of usable web and an increase of "frame scrap" as it is known to thermoformers. Increased frame scrap reduces the output of the forming equipment.

I claim:

1. A method of thermoforming hollow objects including: extruding a web of thermoplastic material directly into a set of temperature controlled tempering rolls, cooling upper and lower surface layers of the web by passage through said tempering rolls which maintaining the interior of the web in molten condition between said surface layers, feeding the partially cooled web onto a conveyor, and conveying the web to the entry of a thermoformer, characterized in that the web is allowed to remain on the conveyor over such a length of the conveyor and for such a time until the surface layer of the web which is in contact with the conveyor has been reheated by the molten interior of the web to a thermoformable temperature below the temperature at which the web will stick to the conveyor.

2. The method of claim 1 wherein the web is fed in a continuous length from extruder to thermoformer.

3. The method of claim 1 wherein the temperature of the conveyor is controlled to assist in controlling the reheating of the surface layer.

4. The method of claim 3 wherein the length of contact between the web and the tempering rolls is adjusted to assist in controlling the temperature of the web.

5. The method of claim 1 wherein the web is fed from the conveyor horizontally into the entry of a thermoformer having vertically opposed molds.

6. The method of claim 1 wherein the web is fed from the conveyor vertically into the entry of a thermoformer having horizontally opposed molds.

7. The method of claim 6 wherein the web length between the conveyor and the molds is unsupported other than by its own structure but is supported after leaving the molds.

8. Apparatus for feeding thermoplastic sheet from an extruder to a thermoformer, including a set of temperature controlled tempering rolls to receive a web of molten thermoplastic material from the extruder, conveyor means to receive the tempered web from the tempering rolls and convey the web to the entry of the thermoformer, characterized in that the relative positions of the tempering rolls and the conveyor means and the length of the conveyor means contacted by the web are adjustable whereby the temperature of the web surface in contact with the conveyor means can be controlled so that it enters the thermoformer at a thermoformable temperature below that at which the web will stick to the conveyor means.

9. The apparatus of claim 8 wherein the conveyor means includes a driven conveyor belt.

10. The apparatus of claim 8 or claim 9 wherein the conveyor means is pivotted to enable its exit end to be moved towards and away from the thermoformer entry.

11. The apparatus of claim 10 wherein the conveyor means is pivotted about a point substantially in the plane of the web as it contacts the conveyor means.

12. The apparatus of claim 11 wherein the location of the said pivot point is adjustable.

13. The apparatus of claim 8 wherein the length of the conveyor means contacted by the web is adjustable so as to retain a portion of continuously extruded web and intermittently feed a retained portion into the thermoformer.

14. The apparatus of claim 8 wherein the conveyor means is located relative to the entry of the thermoformer to feed the web horizontally into the thermoformer and the molds of the thermoformer are movable to permit entry and withdrawal of the conveyor means.

15. The apparatus of claim 8 wherein the conveyor means is located relative to the entry of the thermoformer to feed the web vertically into the thermoformer.

16. The apparatus of claim 15 wherein support means are provided to support product leaving the thermoformer but no support means are provided to support the web between the conveyor means and the thermoformer.

* * * * *